(12) United States Patent
Hamperl et al.

(10) Patent No.: US 6,307,518 B1
(45) Date of Patent: Oct. 23, 2001

(54) ANTENNA CONFIGURATION OF AN APPARATUS FOR DETECTING A CHILD SAFETY SEAT PLACED ON A SEAT OF A MOTOR VEHICLE

(75) Inventors: Reinhard Hamperl, Koefering; Marten Swart, Obertraubling; Arnulf Pietsch, Regensburg; Christian Zelger, Regensburg; Erwin Hetzenecker, Regensburg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/834,528

(22) Filed: Apr. 4, 1997

(30) Foreign Application Priority Data

Nov. 12, 1996 (DE) ........................................ 296 19 668 U

(51) Int. Cl.[7] .................................................. H01Q 11/12
(52) U.S. Cl. .......................... 343/742; 343/741; 343/743; 343/744; 343/866; 340/572; 340/51
(58) Field of Search .................................... 343/742, 741, 343/743, 867, 866; 340/572, 51

(56) References Cited

U.S. PATENT DOCUMENTS

| | | | | |
|---|---|---|---|---|
| 4,509,039 | * | 4/1985 | Dowdle | 340/572 |
| 4,679,046 | * | 7/1987 | Curtis et al. | 342/51 |
| 4,751,516 | * | 6/1988 | Lichtblau | 343/742 |
| 4,806,943 | * | 2/1989 | Doncel | 343/742 |
| 5,126,749 | * | 6/1992 | Kaltner | 343/742 |
| 5,602,556 | * | 2/1997 | Bowers | 343/742 |

FOREIGN PATENT DOCUMENTS

| 4409971C2 | 1/1996 | (DE) . |
|---|---|---|
| 0708002A1 | 4/1996 | (EP) . |

* cited by examiner

Primary Examiner—Robert H. Kim
Assistant Examiner—Layla Lauchman
(74) Attorney, Agent, or Firm—Herbert L. Lerner; Laurence A. Greenberg; Werner H. Stemer

(57) ABSTRACT

An antenna configuration in an apparatus for detecting a child safety seat placed on a seat in a motor vehicle. A single transmitting antenna formed as a loop surrounds two loop-shaped receiving antennas. The receiving antennas receive electromagnetic measurement fields originating from an electromagnetic exciter field transmitted by the transmitting antenna.

13 Claims, 4 Drawing Sheets

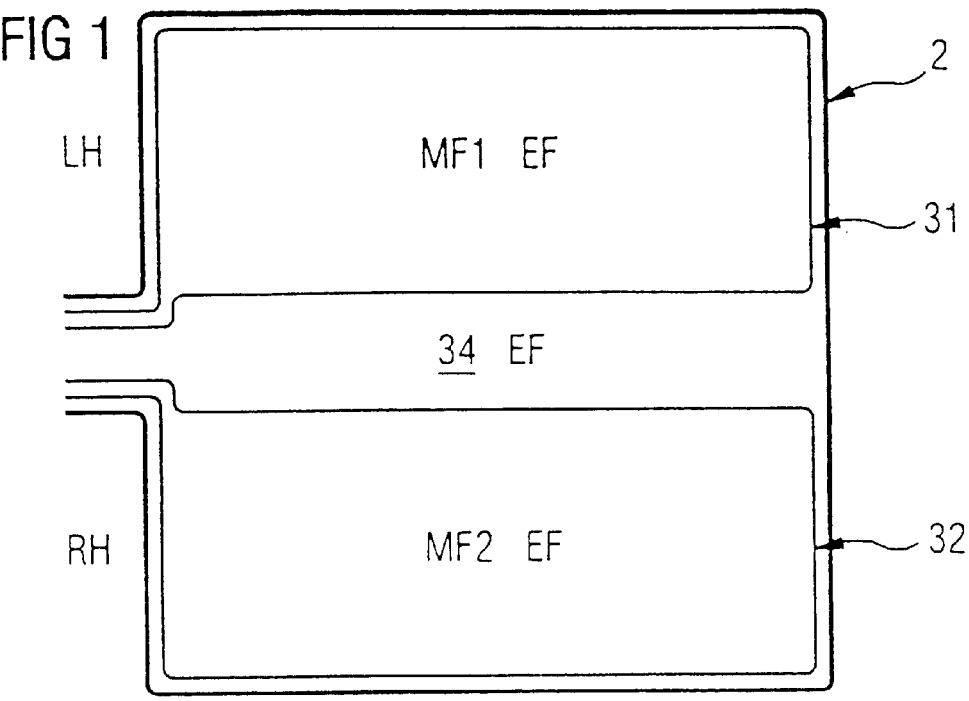
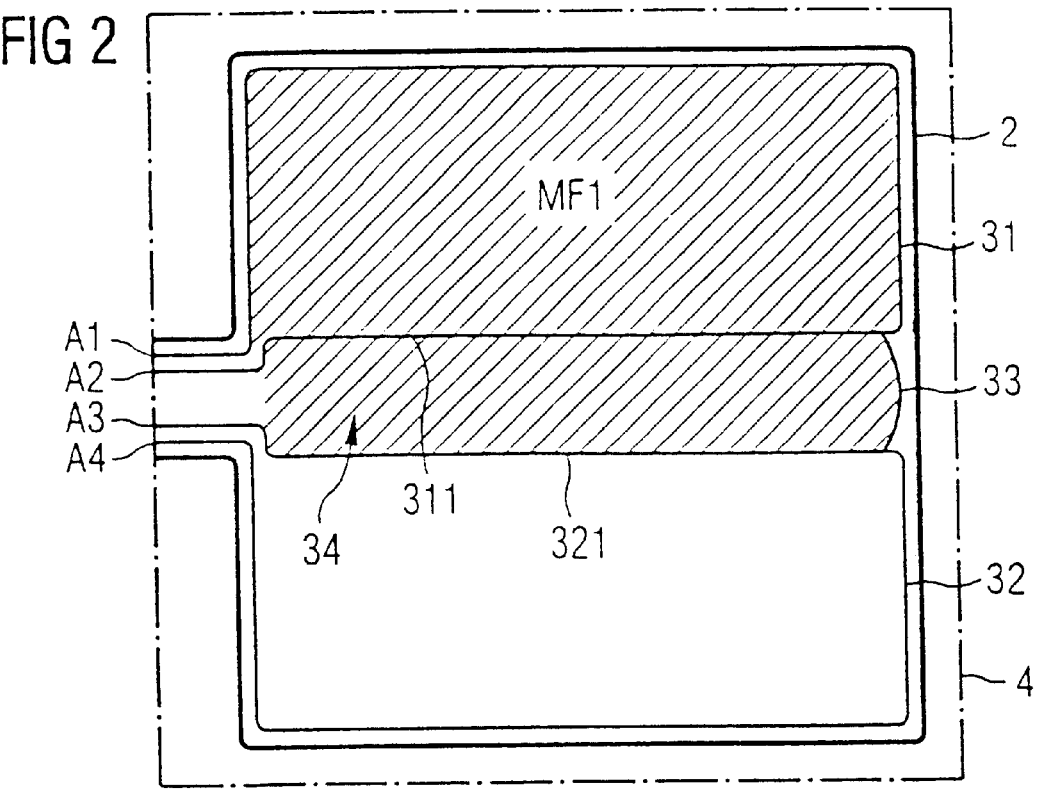

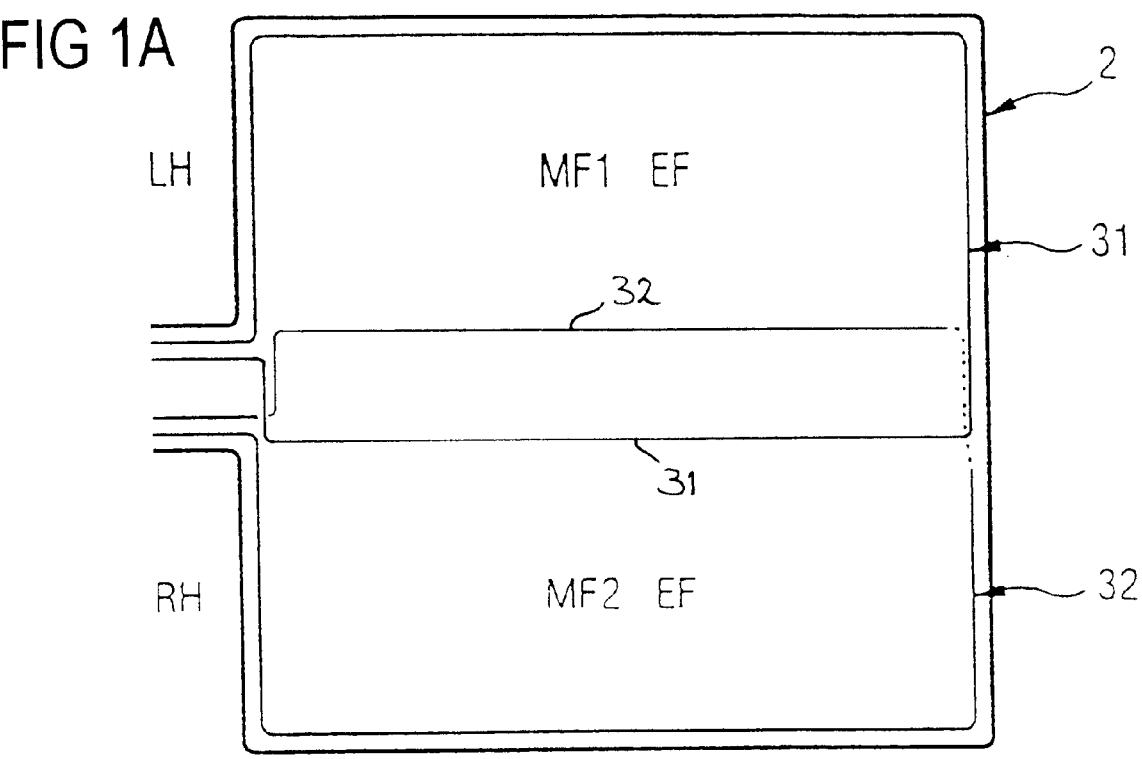

ANTENNA CONFIGURATION OF AN APPARATUS FOR DETECTING A CHILD SAFETY SEAT PLACED ON A SEAT OF A MOTOR VEHICLE

BACKGROUND OF THE INVENTION

Field of the Invention

The invention relates to an antenna configuration of an apparatus for detecting a child safety seat placed on a seat of a motor vehicle.

Especially in light of recent findings regarding the apparent dangers posed by airbags and the development and integration of systems which will ensure proper inflation of airbags (i.e. adjusted inflation force depending on the occupant and/or temporary disengagement of the tripping mechanism), it is most important to dependably determine various bits of information regarding the type and position of any occupant on each motor vehicle seat exposed to such airbags. The information is particularly important when a child safety seat is placed on the vehicle seat.

There has become known from German Patent DE 44 09 971 C2 one such apparatus, in which one transmitting antenna and one receiving antenna each are disposed in the vehicle seat. An electromagnetic exciter field is broadcast periodically via the transmitting antenna. A resonator/transponder of a child safety seat placed on the passenger seat alters the exciter field in a characteristic way. The exciter field altered by the resonator is picked up as a measurement field by the receiving antenna and evaluated by an evaluation circuit. If a single characteristic for a resonator is ascertained in the measurement field, then an output circuit of the apparatus generates a status signal that is supplied in particular to an airbag controller. The airbag controller can vary the tripping of an airbag disposed in front of the vehicle seat, or a side airbag disposed laterally of the seat, on the basis of the status signal output by the child safety seat detection apparatus. Optionally, airbag tripping can be prevented, to protect a child in the child safety seat from the force of the airbag as it inflates.

An improvement of the foregoing system is disclosed in European Patent Disclosure EP 0 708 002. According to that disclosure it is possible not only to detect whether a child safety seat is disposed on the vehicle seat but also to ascertain the orientation of the child safety seat on the vehicle seat: Either the child safety seat is disposed in the travel direction on the passenger seat with its backrest toward the vehicle seat, or the child safety seat is disposed counter to the driving direction on the passenger seat with its backrest toward the dashboard. When child safety seats face forward, it may still be allowable under some circumstances for the airbag to be tripped. To detect the child safety seat orientation, a child safety seat has two resonators, one in its left half and the other in its right half. Correspondingly there are one transmitting antenna and one receiving antenna each disposed in the left and right halves of the vehicle seat. Each resonator alters the exciter field generated by the transmitting antennas in a different way, so that by an evaluation of the measurement fields picked up from the receiving antennas it can be detected which resonator is disposed above which half of the vehicle seat.

With such an antenna configuration, however, a child safety seat placed in skewed orientation on the vehicle seat cannot be detected, for instance where one resonator is located directly above a gap between the transmitting and receiving antennas in the middle of the vehicle seat and the other resonator is on the periphery of the vehicle seat. If the child safety seat is skewed in this way or rotated, and especially if it is placed transversely across the vehicle seat, in which case both resonators are located above the gap, then tripping of the airbag is just as dangerous as in the rear-facing orientation. Yet even so, the child safety seat detection apparatus would still furnish a status signal indicating the absence of a child safety seat. There would be no hindrance to tripping the airbag at its full strength.

SUMMARY OF THE INVENTION

It is accordingly an object of the invention to provide an antenna configuration of an apparatus for detecting a child safety seat placed on a seat of a motor vehicle, which overcomes the above-mentioned disadvantages of the prior art devices and methods of this general type and which allows detection and determination of the orientation of a child safety seat placed on the vehicle seat.

With the foregoing and other objects in view there is provided, in accordance with the invention, a combination of an apparatus for detecting a child safety seat placed on a seat of a motor vehicle and an antenna configuration integrated in the seat of the motor vehicle; the antenna configuration comprises:

a single loop-shaped transmitting antenna for transmitting an electromagnetic exciter field and two loop-shaped receiving antennas for receiving electromagnetic measurement fields.

In accordance with an added feature of the invention, the transmitting antenna has a diameter of at least 20 cm. In a rectangular (or square) loop, the diameter is defined as the shortest distance between sides.

In accordance with an additional feature of the invention, the vehicle seat has a left half and a right half as referred to a longitudinal axis of the vehicle, and wherein a first one of the receiving antennas is assigned to the left half of the vehicle seat and a second one of the receiving antennas is assigned to the right half of the vehicle seat.

In accordance with a further feature of the invention, the first and second receiving antennas overlap each other partly.

In accordance with another feature of the invention, the receiving antennas each have a single winding and are disposed in a single plane. The two receiving antennas may thereby define a gap therebetween, and the assembly includes an electrically conductive connection, across the gap, between the receiving antennas, the gap being bordered by a portion of each of the two receiving antennas and by the electrically conductive connection.

In accordance with again an added feature of the invention, there is provided a common substrate defining the single plane, and wherein the transmitting antenna has a single winding commonly disposed in the single plane with the receiving antennas, and wherein the transmitting antenna enclosed the receiving antennas. Preferably, the receiving antennas are surrounded by the transmitting antenna.

With the foregoing and other objects in view there is also provided, in accordance with the invention, an apparatus for detecting a child safety seat placed on a seat of a motor vehicle, comprising:

an antenna configuration integrated in a seat of a motor vehicle, the antenna configuration having a single loop transmitting antenna for transmitting an electromagnetic exciter field and two loop-shaped receiving antennas for receiving electromagnetic measurement fields;

a control device connected to the transmitting and receiving antennas for impressing the electromagnetic exciter field on the transmitting antenna, evaluating the measurement fields picked up by the receiving antennas, and generating a status signal as a function of the evaluated measurement fields.

In accordance with yet a further feature of the invention, the assembly also comprises one or several resonators secured to a child safety seat, and wherein the control device is programmed to generate a first status signal if neither receiving antennas detect in the respective measurement fields a signal that is typical for the presence of the resonator in the exciter field.

In accordance with yet another feature of the invention, the control device is programmed to generate a second status signal if at least one of the receiving antennas detect in a respective measurement field a signal that is typical for the presence of a single resonator in the exciter field.

In accordance with yet an additional feature of the invention, the control device evaluates an intensity of a first signal typical of a first resonator in the first measurement field and in the second measurement field, as well as an intensity of a second signal typical of a second resonator, both in the first measurement field and in the second measurement field.

In accordance with a concomitant feature of the invention, an output of the status signal depends on a first ratio defined as a division of an intensity of the first signal detected in the first measurement field by an intensity of the first signal detected in the second measurement field and on a second ratio defined as a division of an intensity of the second signal detected in the first measurement field by an intensity of the second signal detected in the second measurement.

Other features which are considered as characteristic for the invention are set forth in the appended claims.

Although the invention is illustrated and described herein as embodied in an antenna configuration of an apparatus for detecting a child safety seat placed on a seat of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING FIGURES

FIG. 1 is a schematic plan view of a first embodiment of the antenna configuration according to the invention;

FIG. 1A is a similar view of a variation of the first embodiment with overlapping receiving antennas;

FIG. 2 is a similar view of a second embodiment of the antenna configuration according to the invention;

DESCRIPTION OF THE PREFERRED EMBODIMENTS

Figure 3:
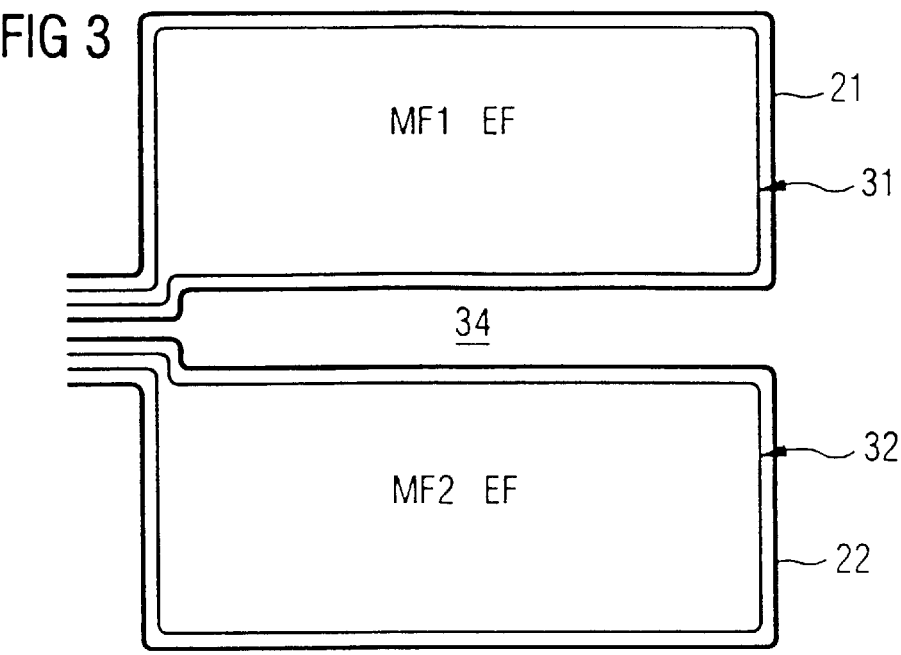
FIG. 3 is a similar view of a prior art antenna configuration.

At the outset it is noted that identical elements or signals are identified by the same reference numerals and symbols throughout the drawing figures.

Referring now to the figures of the drawing in detail and first, particularly, to FIG. 3 thereof, there is seen an antenna configuration as it is known from the European disclosure EP 0 708 002 A1. The system has two transmitting antennas 21, 22 and two receiving antennas 31, 32. One transmitting antenna 21, 22 and one receiving antenna 31, 32 is disposed in each half LH, RH of the vehicle seat, referenced to the longitudinal axis of the vehicle (see FIG. 4). The antennas 21, 22, 31, 32 are embodied in loop form, so that they are inductively coupled with resonators of a child safety seat that are located above the antenna loops. Each resonator of a child safety seat with two resonators (not illustrated in FIG. 3), alters an exciter field EF, generated by the transmitting antennas 21, 22, in a defined, different way. For example, the frequency of the exciter field EF is modulated differently, for instance being divided, by each resonator, so that in measurement fields MF1 and MF2 picked up by the receiving antennas 31 and 32, typical signals S1 and S2 for each resonator can be obtained by demodulation. The energy for modulating the exciter field EF is derived by the resonators from the exciter field EF itself. The signals S1, S2 transmitted by the resonators may also carry data information regarding the type of child safety seat and/or characteristic properties. Moreover, the proper installation position of the child safety seat can be transmitted as well. This information can optionally vary the status signal.

The fields EF, MF1 and MF2 shown in the drawings do not designate the applicable field per se but rather the coil area of an antenna that is operative for that particular field.

Between the transmitting antenna 21 and receiving antenna 31 on one side and the transmitting antenna 22 and receiving antenna 32 on the other is a gap 34 in the middle of the vehicle seat; it is covered by none of the antenna areas defined by the antenna loops. In that prior art antenna configuration, the following disadvantages result: If the child safety seat is placed skewed on the vehicle seat, so that one of its two resonators is disposed above the gap 34, then for the lack of inductive coupling, this resonator cannot be excited by the exciter fields EF emitted by the transmitting antennas. The exciter fields EF generated by the transmitting antennas 21 and 22 cancel one another above the gap 34. The apparatus for detecting a child safety seat would not recognize any child safety seat disposed in this way and would furnish an incorrect status signal. In other words, the resulting status signal would be "no child seat" and the possible tripping of the airbag would not be prevented, thus resulting in a potential source of injury to a child in the child safety seat when the airbag is exploded at full power due to the incorrect information furnished to the air bag control system.

Referring now to FIG. 1, the inventive system solves this problem: Only a single transmitting antenna 2, surrounding the two receiving antennas 31 and 32, is provided, so that both above the antenna areas of the receiving antennas 31 and 32 and above the gap 34 between the receiving antennas 31 and 32, a homogeneous exciter field EF, induced by the transmitting antenna 2, of resonators of a child safety seat placed on the vehicle seat is detected, even if one or both resonators is located above the gap 34. The area covered by the transmitting loop antenna 2 is designed such that when the two resonators of a child safety seat placed in the normal position (in the middle) on the vehicle seat are projected onto the vehicle seat, the resonator areas in each case come to be located within the transmitter coil area. The coil area of the transmitting antenna should be enlarged accordingly, even though there is no danger to the child from airbag tripping even if a forward-facing child safety seat is shifted slightly to the side, front or back.

Experiments have shown that the diameter of the transmitter coil 2—if the coil is rectangular or square in shape, the diameter is defined as the minimum distance between two opposed coil portions—is preferably at least 20 cm, given optimized geometrical dimensions of the resonators and a tolerable lateral shift of the child safety seat out of the normal position. With this antenna configuration, child safety seats that are either skewed or are oriented 90° away can be reliably detected.

With reference to FIG. 1A, the areas enclosed by the receiving antennas 31 and 32 preferably overlap. Thus the middle region of the vehicle seat, defined until now by the gap 34, is now located inside both receiving antennas 31 and 32, so that a resonator located above this middle region is coupled in the best possible way to both the first receiving antenna 31 and the second receiving antenna 32, and a signal of great amplitude that is not sensitive to interference can be picked up from the receiving antennas 31 and 32.

If the transmitting coil 2 and the receiving coils 31 and 32 are disposed on a multilayer substrate, such as a flexible polyamide substrate, then the first receiving antenna 31 is disposed in a first layer of the substrate and the second receiving antenna 32 is in a further layer, so that the two receiving antennas 31 and 32, insulated from one another in the substrate, have an overlapping region. The transmitting antenna 2 is disposed in one of the two layers.

In the preferred embodiment, both the transmitting antenna 2 and the receiving antennas 31 and 32 have only a single winding. This assures that the antenna configuration substrate occupies only a minimal structural height, which is advantageous for incorporation into a vehicle seat. However, the antennas 2 and 3 may also have a plurality of windings, if necessary in order to generate or pick up the electromagnetic fields.

If a single layer substrate 4 is available, then an antenna configuration in accordance with FIG. 2 is extremely advantageous. The receiving antennas 31 and 32 located in the two halves of the transmitting antenna 2 are connected to one another by an electrically conductive connection 33. The electrically conductive connection 33 spans the gap 34, so that the gap 34 is framed in by portions 311 and 321 of the receiving antennas 31 and 32, respectively, and by the electrically conductive connection 33. Here, the transmitting antenna 2, the receiving antennas 31 and 32, and the electrical connector 33 are located in one plane. To detect a measurement field MF1, shown shaded in the drawing (encompassing, for example, both the gap 34 and the left half LH of the area covered by the transmitting antenna 2), signals are picked up at the terminals A1 and A3 of the receiving antennas 31 and 32, respectively. In chronologically staggered fashion, a measurement field MF2 that includes both the right half of the transmitting antenna 2 and the gap 34 can be picked up at the terminals A2 and A4 of the receiving antennas 31 and 32. This further feature makes it possible to use a one-layer substrate for the disposition of all the antennas, which is advantageous especially in terms of the structural height of the antenna configuration and in terms of the number of components. It is nevertheless possible to cover the middle region of the vehicle seat with an antenna area that is assigned to both receiving antennas 31 and 32. Only a single printing process is needed to produce this kind of antenna foil. Compared with the prior art antenna configuration of FIG. 3 with its two transmitting antennas 21 and 22, the line lengths of the transmitting antenna 2 is shortened. Thus the number of antenna terminals is reduced as well. In the transmitting circuit, only a single power end stage is needed for generating the exciter field EF or the carrier frequency. Moreover, the antenna configuration has no antenna trains in the middle region of the vehicle seat, which is advantageous because the seat is typically severely strained precisely in the middle region of the vehicle seat.

The receiving antennas in accordance with FIGS. 1 and 2 are advantageous because the antennas have no crossings. To that end, the terminals of the antennas are disposed on one side of the antenna configuration. Because of the symmetrical arrangement of the receiving antennas 31 and 32 with respect to the transmitting antenna 2, both the receiving antenna 31 and the receiving antenna 32 have the same coupling factor with regard to the transmitting antenna 2. In an antenna configuration of FIG. 1 or FIG. 2, advantageously in one of the measurement fields MF1 or MF2 picked up by one of the receiving antennas 31 or 32, not only the strongly coupled-in signal of the resonator located above the respective receiving antenna but also the weakly coupled-in signal of the resonator at a distance from the receiving antenna are evaluated in order to provide conclusions about the precise location and orientation of the child safety seat. Evaluating the weakly coupled-in signal is necessary whenever the two receiving antennas 31 and 32 have an overlapping region, since the strongly coupled resonator has a constant maximum coupling, over a relatively wide range, with regard to one of the receiving antennas 31 or 32 including the gap 34. The weakly coupled signal of the far resonator provides information about the alignment of the child safety seat.

Figure 4:
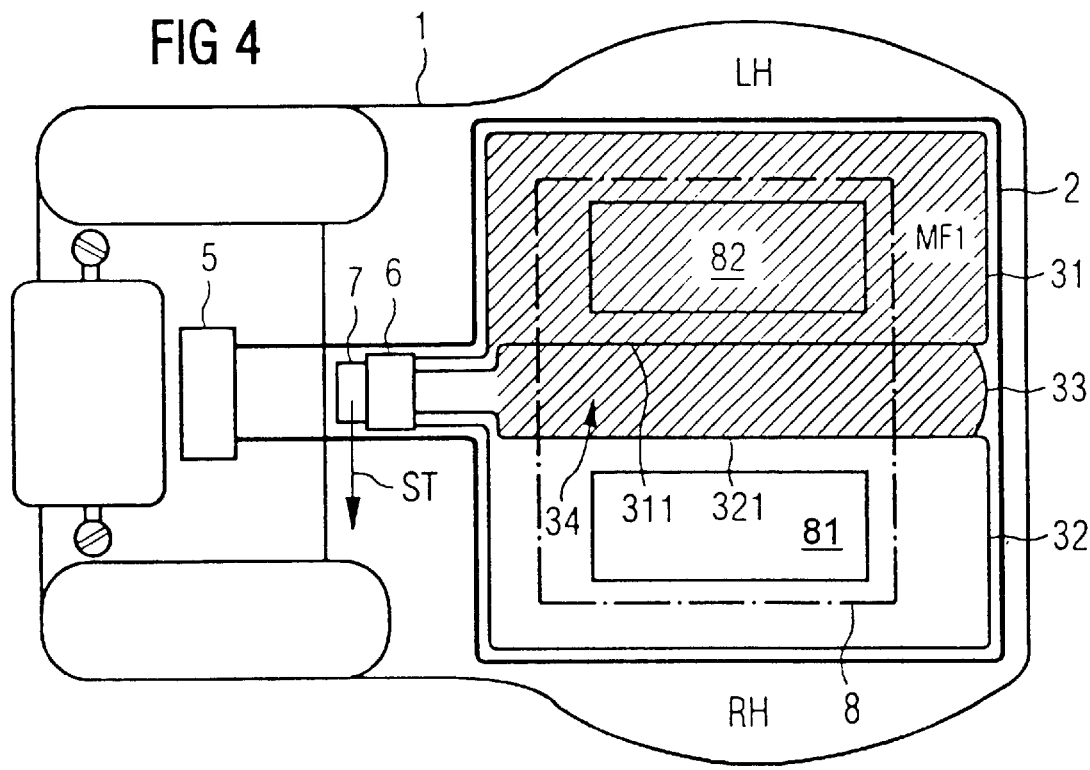
FIG. 4 is a schematic plan view of the antenna configuration of FIG. 2 disposed in a vehicle seat.

FIG. 4 shows the antenna configuration of FIG. 2 according to the invention, built into the seat surface of a vehicle seat 1; at least for the most part, the left half LH of the vehicle seat 1 is covered by the first receiving antenna 31 and the right half RH of the vehicle seat 1 is covered by the second receiving antenna 32. Given suitable coupling to the resonators in the child safety seat, the antenna configuration may also be disposed in the seat back. A child safety seat 8 placed on the vehicle seat 1 and having resonators 81 and 82 is shown in dashed lines. This child safety seat 8 is placed in a normal position on the vehicle seat 1. The apparatus for child safety seat detection has not only the antenna configuration but a transmitting circuit 5 for outputting the exciter field EF via the transmitting antenna 2 and an evaluation circuit 6 for evaluating the measurement fields MF1 and MF2 picked up by the receiving antennas 31 and 32 together with the electrically conductive connection 33, as well as an output circuit 7 for outputting status signals ST as a function of the measurement fields MF1 and MF2 evaluated by the evaluation circuit 6. The control device 5, 6, 7 made up of the transmitting circuit 5, evaluation circuit 6 and output circuit 7, is preferably a microprocessor.

An apparatus for detecting child safety seat furnishes the following status signals to an airbag controller:

First control signal ST1: no child safety seat is mounted on the vehicle seat;

Second control signal ST2: a child safety seat is considerably out of position or twisted on the vehicle seat;

Third control signal ST3: a child safety seat is located approximately centrally and facing forward on the vehicle seat;

Fourth control signal ST4: a child safety seat is located approximately centrally and facing backward on the vehicle seat.

Evaluating the status signals ST is the task of the airbag controller. For instance, the status signals ST2 and ST4, respectively, prevent and soften the inflation of a respective airbag. When the third status signal ST3 is present, tripping of the airbag should be allowable. As an option, tripping can be made dependent on the type of child safety seat here. If the first status signal ST1 indicates that no child safety seat is detectable, then a decision to trip should additionally be made as a function of a seat occupation detection.

Figure 5:
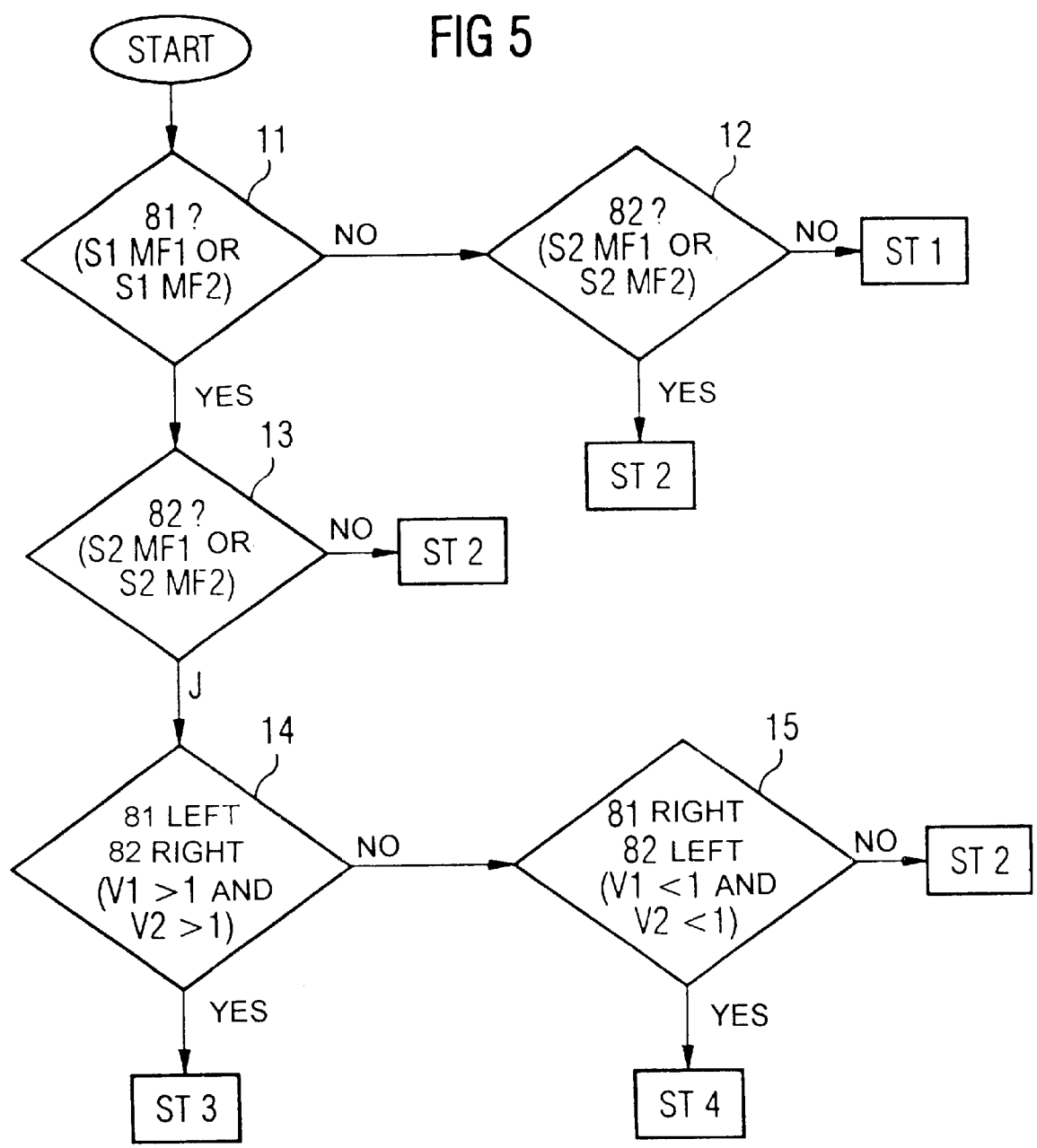
FIG. 5 is a flow chart for evaluating the signals furnished by the receiving antennas of the antenna configuration according to the invention.

Referring now to FIG. 5, upon evaluation of the measurement fields MF1 and MF2, a first process step 11 queries whether the first resonator 81 is located in the exciter field EF. If the signal S1 typical for the resonator 81 is detected in at least one of the two measurement fields MF1 and MF2 with a minimum amplitude, then the first resonator 81 is considered to have been detected. In further steps 12 and 13, queries are performed as to whether the second resonator 82 is located in the exciter field EF. If the signal S2 typical for the second resonator 82 is detected in at least one of the two measurement fields MF1 and MF2 with a minimum amplitude, then the second resonator 82 is considered to have been detected. If neither the first resonator 81 nor the second resonator 82 is detected by the evaluation circuit 6, then the first status signal ST1 is generated by the output signal 7. If only one of the two resonators 81 or 82 is detected, then the second control signal ST2 is generated.

If both resonators 81 and 82 are detected, then it is determined, as a function of the intensity I of the signals S1 and S2 extracted from the measurement fields MF1 and MF2, how the child safety seat is aligned on the vehicle seat. To that end, a first ratio V1 is formed of the intensity I(S1MF1) of the first signal S1 detected in the first measurement field MF1 to the intensity I(S1MF2) of the first signal S1 detected in the second measurement field MF2, and a second ratio V2 is formed of the intensity I(S2MF2) of the signal S2 detected in the second measurement field MF2 to the intensity I(S2MF1) of the signal S2 detected in the first measurement field MF1. If both ratios V1 and V2 are greater than 1, then the child safety seat is mounted approximately in the middle and facing forward on the vehicle seat, so that the third control signal ST3 is generated. If both ratios V1 and V2 are less than 1, then the child safety seat is mounted approximately in the middle and facing backward on the vehicle seat, so that the fourth control signal ST4 is generated. If one of the ratios V1 or V2 has a value greater than 1 and the other ratio V2 or V1 has a value less than 1, then the second control signal ST2 is generated.

Preferably it is determined not only whether the first or second signal S1 or S2 is greater in one of the measurement fields MF1 or MF2 than in the other, which amounts to a comparison of the ratios V1 and V2 with a threshold value SW=1. The threshold value SW may include not only a constant component but also a dynamic component, in the form of a third ratio V3 which is the ratio of the ratio V1 to the ratio V2. The third ratio V3 shows the extent to which a child safety seat is displaced on the vehicle seat. For instance, if the first ratio V1 has a value far greater than 1 and the second ratio V2 has a value close to 1, then the first resonator 81 is located on the left edge of the vehicle seat 1 and the second resonator 82 is accordingly approximately in the middle of the vehicle seat. Depending on how this child safety seat orientation is assessed, the second status signal ST2 can for instance be generated.

We claim:

1. In combination with an apparatus for detecting a child safety seat placed on a seat of a motor vehicle, an antenna configuration integrated in the seat of the motor vehicle, the antenna configuration comprising:
a single loop-shaped transmitting antenna for transmitting an electromagnetic exciter field and two loop-shaped receiving antennas for receiving electromagnetic measurement fields.

2. The combination according to claim 1, wherein said transmitting antenna has a diameter of at least 20 cm.

3. The combination according to claim 1, wherein the vehicle seat has a left half and a right half as referred to a longitudinal axis of the vehicle, and wherein a first one of said receiving antennas is assigned to the left half of the vehicle seat and a second one of said receiving antennas is assigned to the right half of the vehicle seat.

4. The combination according to claim 3, wherein said first and second receiving antennas overlap each other partly.

5. The combination according to claim 1, wherein said receiving antennas each have a single winding and are disposed in a single plane.

6. The combination according to claim 5, wherein said two receiving antennas define a gap therebetween, and including an electrically conductive connection, across said gap, between said receiving antennas, said gap being bordered by a portion of each of said two receiving antennas and by said electrically conductive connection.

7. The combination according to claim 5, which further comprises a common substrate defining the single plane, and wherein said transmitting antenna has a single winding commonly disposed in the single plane with said receiving antennas, and wherein said transmitting antenna enclosed said receiving antennas.

8. The combination according to claim 1, wherein said receiving antennas are surrounded by said transmitting antenna.

9. An apparatus for detecting a child safety seat placed on a seat of a motor vehicle, comprising:
an antenna configuration integrated in a seat of a motor vehicle, said antenna configuration having a single loop transmitting antenna for transmitting an electromagnetic exciter field and two loop-shaped receiving antennas for receiving electromagnetic measurement fields;
a control device connected to said transmitting and receiving antennas for impressing the electromagnetic exciter field on said transmitting antenna, evaluating the measurement fields picked up by said receiving antennas, and generating a status signal as a function of the evaluated measurement fields.

10. The apparatus according to claim 9, which further comprises a resonator secured to a child safety seat, and wherein said control device is programmed to generate a first status signal if neither receiving antennas detect in the respective measurement fields a signal that is typical for the presence of the resonator in the exciter field.

11. The apparatus according to claim 9, which further comprises a resonator secured to a child safety seat, and wherein said control device is programmed to generate a second status signal if at least one of said receiving antennas detect in a respective measurement field a signal that is typical for the presence of a single resonator in the exciter field.

12. The apparatus according to claim 9, wherein the control device evaluates an intensity of a first signal typical of a first resonator in the first measurement field and in the second measurement field, as well as an intensity of a second signal typical of a second resonator, both in the first measurement field and in the second measurement field.

13. The apparatus according to claim 12, wherein an output of the status signal depends on a first ratio defined as a division of an intensity of the first signal detected in the first measurement field by an intensity of the first signal detected in the second measurement field and on a second ratio defined as a division of an intensity of the second signal detected in the first measurement field by an intensity of the second signal detected in the second measurement field.

* * * * *